United States Patent [19]

Dolan

[11] Patent Number: 4,787,477

[45] Date of Patent: Nov. 29, 1988

[54] STAND FOR ALL TERRAIN VEHICLE

[76] Inventor: Rex H. Dolan, Hwy. 80 and 4th Ave., Forest, Miss. 39074

[21] Appl. No.: 144,277

[22] Filed: Jan. 15, 1988

[51] Int. Cl.<sup>4</sup> ............................................. A01M 31/02
[52] U.S. Cl. ................................... 182/116; 182/127; 182/156; 280/760
[58] Field of Search ............... 182/127, 116, 129, 152, 182/156; 280/32.5, 760

[56] References Cited

U.S. PATENT DOCUMENTS

| 3,621,935 | 11/1971 | Bode | 182/127 |
|---|---|---|---|
| 3,967,694 | 7/1976 | Woolfolk | 182/108 |
| 4,113,055 | 9/1978 | Gleockler | 182/127 |
| 4,408,680 | 10/1983 | Ross | 182/127 |
| 4,442,919 | 4/1984 | Fulcher | 182/127 |
| 4,614,252 | 9/1986 | Tarner | 182/116 |
| 4,625,831 | 12/1986 | Rodgers | 182/116 |
| 4,696,374 | 9/1987 | Hale | 182/127 |

FOREIGN PATENT DOCUMENTS 2946521  5/1981  Fed. Rep. of Germany ...... 182/127

Primary Examiner—Reinaldo P. Machado
Attorney, Agent, or Firm—Laubscher & Laubscher

[57] ABSTRACT

A hunting stand for an all terrain vehicle is characterized by a collapsible frame connected with the vehicle and including front and rear pairs of legs formed of hinged upper and lower sections pivotal between folded and extended positions. A locking sleeve is slidably connected with each leg for locking the hinges when the leg sections are in the extended position. A pair of braces are releasably connected between the front and rear legs on each side of the stand to stabilize the legs when they are in the extended position. A platform is connected with the top of the frame to define a support surface. When the leg sections are in the folded position, the platform is arranged generally vertically behind the seat of the vehicle. When the leg sections are in the extended position, the platform is arranged horizontally and is spaced above the vehicle.

10 Claims, 2 Drawing Sheets

STAND FOR ALL TERRAIN VEHICLE

BACKGROUND OF THE INVENTION

When hunting in flatlands or in areas where timber has previously been cut-over, trees are not available for standard hunting stands. The present invention was developed to provide an extensible hunting stand which may be directly mounted on an all terrain vehicle. A hunter rides the vehicle to the desired hunting location, unfolds and erects the stand, and then climbs to the top of the stand which provides convenient, elevated hunting position.

BRIEF DESCRIPTION OF THE PRIOR ART

Hunting stands for all terrain vehicles are well-known in the patented prior art as evidenced by the U.S. patents to Tarner U.S. Pat. No. 4,614,252, Rodgers, Jr. U.S. Pat. No. 4,625,831 and Hale U.S. Pat. No. 4,696,374. The Tarner and Rodgers patents, for example, disclose portable stands that are partially supported by the vehicle and which abut against a tree for further support. These devices are therefore unsuitable for use in flatlands or in areas where a forest has been harvested since no trees are available to support the stand.

The hunting stand disclosed in the Hale patent is partially supported by the vehicle and partially supported by the ground. A major drawback of this stand is that its height is limited. Moreover, like the other prior stands, it is rather cumbersome and difficult to erect and strike.

The present invention was developed in order to overcome these and other drawbacks of the prior devices by providing a hunting stand for an all terrain vehicle which is mounted on and supported directly by the vehicle. Owing to a unique hinge and hinge lock assembly, the device may be quickly erected and struck between folded and extended positions. Furthermore, the hinges and hinge locks enhance the overall stability of the stand, particularly when in the extended position. Finally, with its unique design, the stand is folded out of the way of the driver of the all terrain vehicle and provides a back rest for stability and comfort.

SUMMARY OF THE INVENTION

Accordingly, it is a primary object of the present invention to provide a stand for an all terrain vehicle including a collapsible frame mounted on the vehicle and a platform connected with the frame to define a support surface. The frame includes front and rear pairs of legs, each leg having upper and lower sections which are connected together by tapered hinges. Owing to the hinge connection, the sections of each leg are pivotal between a folded position where the sections are arranged generally horizontally at an acute angle relative to each other and an extended position where the sections are arranged end to end. A tapered locking sleeve is slidably mounted on each leg and is adapted to slide over the tapered hinge of the leg to lock the hinges and prevent movement of the leg sections when they are in the extended position. Braces are removably connected between the front and rear legs on either side of the stand to stabilize the legs of the stand when they are in the extended position. With the locking sleeves released and the leg sections in the folded position, the platform is arranged generally vertically behind the seat of the vehicle to define a seatback portion thereof. When the leg sections are unfolded and locked in their extended positions, the platform is arranged horizontally above the vehicle in spaced relation.

According to a more specific object of the invention, each brace has one end pivotally connected with the lower section of a rear leg adjacent the hinge and the other end of the brace is removably connected with the lower section of a front leg adjacent the hinge. More particularly, the removably connected end of the brace comprises a hook portion which latches with a projection on the front leg lower section. By lifting the hook portion of the brace, the hook portion is released from the projection and simultaneously strikes the hinge locking sleeve to raise the sleeve from its locked position, thereby enabling the sections of the front leg to move to the folded position.

The pivotally connected end of the brace is provided with a cam surface which abuts against the rear leg locking sleeve when it is in its locking position. When the brace is lowered, the cam surface pushes upwardly on the locking sleeve to raise the sleeve from its locked position enabling the sections of the rear leg to move to the folded position.

BRIEF DESCRIPTION OF THE FIGURES

Other objects and advantages of the present invention will become apparent from a study of the following specification when viewed in the light of the accompanying drawing, in which.

DETAILED DESCRIPTION

Figure 3:
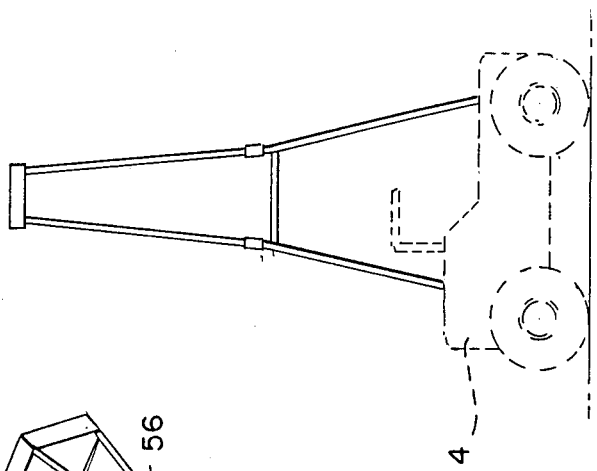
FIGS. 1, 2, and 3 are front plan views of the all terrain vehicle stand of the invention in its folded, partially extended, and fully extended positions, respectively.
Figure 2:
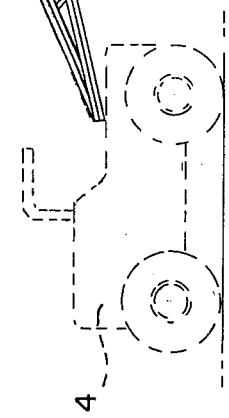
Figure 1:
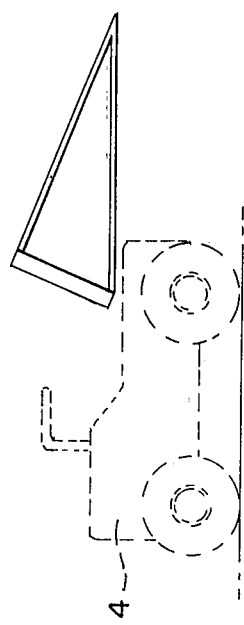

As shown in FIGS. 1-3, the stand 2 of the present invention is mounted on an all terrain vehicle 4. The stand, which is often referred to as a hunting stand, is shown in its folded condition in FIG. 1, in a partially extended position in FIG. 2, and in its fully extended erect position in FIG. 3 wherein it provides an elevated support platform for a hunter to locate game and the like.

Figure 4:
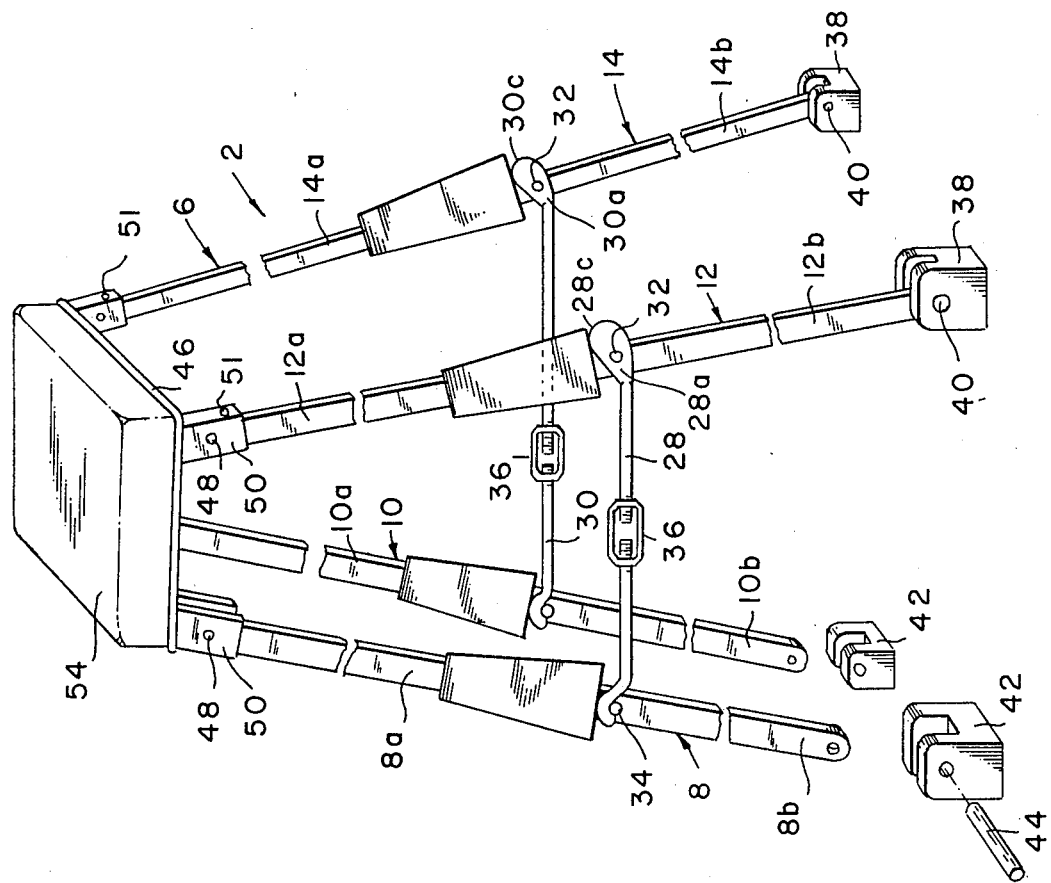
FIG. 4 is a detailed perspective view of the stand of FIG. 3 in its extended position.

Referring now to FIG. 4, the stand comprises a collapsible frame 6 formed of any rigid lightweight metal such as aluminum and having a pair of front legs 8, 10 and a pair of rear legs 12, 14. Each leg includes an upper section 8a, 10a, 12a, 14a and a lower section 8b, 10b, 12b, 14b, respectively. The sections of each leg are joined together by hinges 16 shown more particularly in FIGS. 5 and 6. The hinged connection of the leg sections enables the legs to be pivoted between the folded position of FIG. 1 wherein the sections are generally horizontal and arranged at an acute angle, and the extended position of FIG. 3 wherein the sections are arranged end to end.

Figure 5:
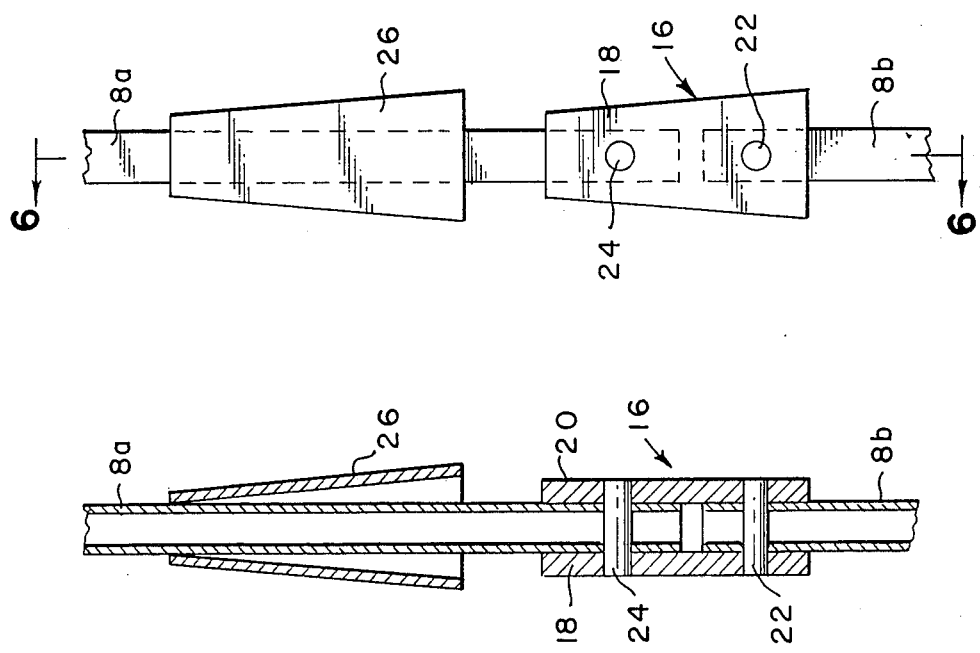
FIG. 5 is a detailed plan view of a hinge and hinge locking sleeve according to the invention.
Figure 6:
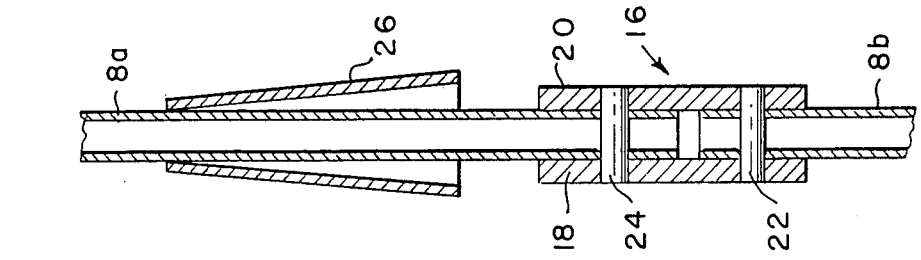
FIG. 6 is a sectional view taken along line 6—6 of FIG. 5.

Referring now to FIGS. 5 and 6, the hinged connection of the sections 8a, 8b of the front leg 8 will be described, it being understood that the sections of the remaining legs are connected in a similar manner. The hinge 16 comprises a pair of plates 18, 20 which are tapered outwardly from top to bottom as shown in FIG. 5. A lateral hinge pin 22 passes through an opening in the lower portion of the hinge plate 18, through aligned openings in the top of the leg lower section 8b, and through an aligned opening in the hinge plate 20, whereby the lower section 8b of the leg may pivot about the pin 22. Similarly, a second lateral hinge pin 24 passes through aligned openings in the upper portion of the hinge plates 18, 20 and in the bottom of the leg upper section 8a, whereby the upper section may pivot about the pin 24.

A rigid metal tapered sleeve 26 is slidably mounted on each leg above the hinge thereof as shown in FIG. 5. When the sleeve is located away from the hinge, the leg sections are free to pivot about the hinge pins between their folded and extended positions. However, when the sleeve is moved downwardly to cover the hinge as shown in FIG. 4, the sleeve, whose taper conforms with the taper of the hinge, is wedged against the hinge to prevent the leg sections from pivoting about the hinge pins, thereby locking the hinge and the leg sections in the extended position.

Referring once again to FIG. 4, the stand according to the invention also includes a pair of braces 28, 30 arranged between the front and rear legs on either side of the stand. More particularly, the rear end 28a of the brace 28 is pivotally connected with the lower section 12b of the left rear leg 12 by means of a pivot pin 32. The front end of the brace 28 defines a hook portion 28b which latches about a lateral projection 34 extending from the front left leg 8. In this manner, the brace 28 is releasably connected between the legs 8 and 12. The second brace 30 is connected between the front right leg 10 and the rear left leg 14 in the same manner as the brace 28.

A unique feature of the braces is that when they are positioned horizontally to interconnect to front and rear legs on opposite sides of the stand, they are arranged just below the hinges of each leg. As noted above, when the stand is in its extended position shown in FIG. 4, the braces are hooked about the projections on the front legs and the sleeves slide down the legs either by gravity or by manual force to cover the hinges and lock the hinges and the leg sections in the extended position. When it is desired to strike the stand, an upward force applied to the hook end of each brace releases the hook from the corresponding projection and simultaneously engages the bottom of the sleeve on the associated leg to lift the sleeve above the hinge, thereby enabling the front leg sections to pivot about the hinge pins toward the folded position. The rear end 28a of the brace 28 and the rear end 30a of the brace 30 both contain cam surfaces 28c, 30c. After the hook ends of each brace have been released, downward movement of each brace causes the cam surfaces 28c, 30c to engage and lift the associated sleeve above the hinge of each rear leg to release the hinge and allow the rear leg sections to pivot toward the folded position.

A further unique feature of the braces 28, 30 is that each contains a turnbuckle 36 for adjusting the length of each brace. Thus when the braces are connected between the respective front and rear legs, the turnbuckles can be adjusted to shorten the braces slightly to draw the legs together to tighten the stand, increasing its structural integrity. The turnbuckles also enable an adjustment of the distance between the front and rear legs where the stand is to be mounted on vehicles of different length.

Mounting of the stand to the all terrain vehicle will be described with reference to FIG. 4. A pair of brackets 38 are fixed to the top rear portion of the vehicle. The rear leg sections 12b, 14b are rotatably connected with the brackets, respectively, such as by pivot pins 40. A second pair of brackets 42 is also fixed to the vehicle at the front thereof. The lower sections 8b, 10b of the legs 8, 10 are inserted in the brackets 42 and held in place by the pin 44. Preferably, only the front legs are removably connected with the vehicle, thereby enabling folding and erection of the stand.

Figure 8:
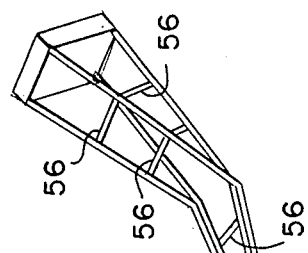
FIGS. 7 and 8 are perspective views of alternate seats for connection with the support platform.
Figure 8:
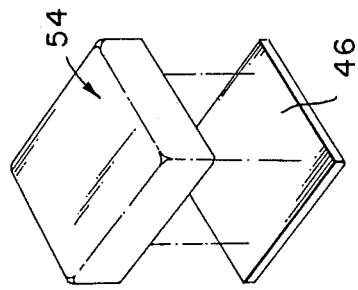
Figure 7:
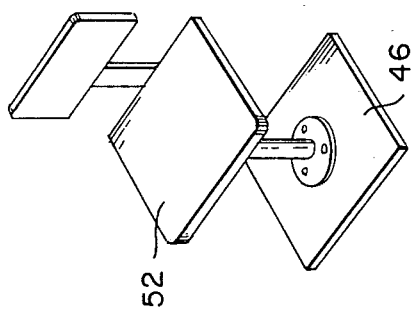

A platform 46 is connected with the upper ends of the leg upper sections using pivot pins 48 which enable the legs to pivot within sockets 50 beneath the platform 46. Tension adjusting screws are 51 are connected with the sockets to enable the platform to be used with different sized frames. A telescoping swivel seat 52 may be releasably connected with the platform as shown in FIG. 7. Alternatively, a padded cushion 54 may be connected with the platform as shown in FIG. 8.

The frame also includes cross bars 56 connected between the pair of front legs and between the pair of rear legs. In addition to strengthening the stand, the cross bars serve as steps whereby a hunter may climb up onto the platform.

A further benefit obtained by the unique hunting stand according to the invention is that the platform defines a backrest for the driver of the vehicle when the stand is in the folded position as shown in FIG. 1. The stand is positioned completely out of the way of the driver in a compact folded configuration. Moreover, the folded frame defines a rack to which the hunter's catch can be secured for transport.

Erecting the frame can easily be done in a matter of seconds. The leg upper sections are first unfolded about the hinge pins as shown in FIG. 2. Next, the front legs are connected with the front mounting brackets 42 and the stand is in its fully extended position. Finally, the braces 28, 30 are hooked to the projections on the front legs and the sleeves 26 are wedged onto the hinge 16. If necessary, the turnbuckles 36 are tightened to fully secure the frame.

While in accordance with the provisions of the patent statute the preferred forms and embodiments have been illustrated and described, it will apparent to those of ordinary skill in the art that various changes may be made without deviating from the inventive concepts set forth above.

What is claimed is:

1. An extensible stand for use in connection with an all terrain vehicle, comprising
    (a) a collapsible frame including
        (1) front and rear pairs of legs, each leg comprising upper and lower sections;
        (2) hinge means for connecting said upper and lower leg sections together, said sections of each leg being pivoted between a folded position wherein said sections are arranged at an acute angle and an extended position wherein said sections are arranged vertically end to end;
        (3) locking means for locking each of said hinge means when said leg sections are in the extended position; and
        (4) brace means releasably connected between front and rear legs for stabilizing the legs when in the extended position; and
    (b) a platform connected with the upper ends of said legs to define a support surface, whereby when said leg sections are in the folded position, said platform is arranged generally vertically behind the seat of the vehicle and when said leg sections are in the extended position, said platform is arranged horizontally and is spaced above the vehicle.

2. Apparatus as defined in claim 1, wherein said locking means comprises a sleeve slidably arranged relative to a hinge for displacement between an unlocked position wherein said sleeve is spaced from said hinge and a locked position wherein said sleeve engages and covers said hinge.

3. Apparatus as defined in claim 2, wherein each of said hinges and said sleeves has a tapered configuration, whereby said sleeve is wedged against said hinge when in the locked position.

4. Apparatus as defined in claim 2, wherein each of said brace means is pivotally connected at one end with the lower section of a rear leg adjacent said hinge means, and further wherein the other end of said brace means is removably connected with the lower section of a front leg adjacent said hinge means.

5. Apparatus as defined in claim 4, wherein said front leg lower sections each include a lateral projection and further wherein the other end of said brace means comprises a hook portion for releasably engaging said projection, said brace hook portion striking and releasing said locking means from said front leg hinge means when said brace means is lifted to release said hook portion from said projection.

6. Apparatus as defined in claim 5, wherein said one end of said brace means comprises a cam surface which engages and releases said locking means from said front leg hinge means when said brace means is lowered following release from said projection.

7. Apparatus as defined in claim 6, and further comprising means for pivotally connecting said rear legs with said vehicle.

8. Apparatus as defined in claim 7, and further comprising means for releasably connecting said front legs with the vehicle.

9. Apparatus as defined in claim 8, and further comprising cross bars connected between said front pair of legs and between said rear pair of legs.

10. Apparatus as defined in claim 9, and further comprising a seat rotatably connected with said platform.

* * * * *